(12) United States Patent
Burchfield et al.

(10) Patent No.: US 10,733,220 B2
(45) Date of Patent: Aug. 4, 2020

(54) DOCUMENT RELEVANCE DETERMINATION FOR A CORPUS

(71) Applicant: International Business Machines Corporation, Armonk, NY (US)

(72) Inventors: Steven N. Burchfield, Woodstock, NY (US); Steven P. Lafalce, Salt Point, NY (US); Maurice M. Materise, Dutchess, NY (US); James A. Oconnor, Ulster Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

(21) Appl. No.: 15/794,487

(22) Filed: Oct. 26, 2017

(65) Prior Publication Data
US 2019/0130024 A1 May 2, 2019

(51) Int. Cl.
*G06F 16/00* (2019.01)
*G06F 16/33* (2019.01)
*G06F 16/93* (2019.01)
*G06F 16/31* (2019.01)

(52) U.S. Cl.
CPC ......... *G06F 16/334* (2019.01); *G06F 16/316* (2019.01); *G06F 16/93* (2019.01)

(58) Field of Classification Search
CPC ....... G06F 16/334; G06F 16/93; G06F 16/316
See application file for complete search history.

(56) References Cited

U.S. PATENT DOCUMENTS

| 6,038,561 | A  | * | 3/2000  | Snyder ................. G06F 16/34 |
| 6,542,889 | B1 | * | 4/2003  | Aggarwal ............. G06F 16/36 |
| 7,440,947 | B2 |   | 10/2008 | Adcock et al. |
| 8,122,043 | B2 |   | 2/2012  | Buckley et al. |
| 8,706,664 | B2 |   | 4/2014  | Downs et al. |
| 9,183,173 | B2 |   | 11/2015 | Yih et al. |
| 9,311,391 | B2 |   | 4/2016  | Lepsoy et al. |

(Continued)

FOREIGN PATENT DOCUMENTS

| WO | 2016081749 A1 | 5/2016 |
| WO | 2016093837 A1 | 6/2016 |

OTHER PUBLICATIONS

W.-Tau Yih, "Learning Term-weighting Functions for Similarity Measures", Microsoft Resarch, empirical methods in natural language processing, 2009, p. 1-10.

(Continued)

*Primary Examiner* — Tarek Chbouki
(74) *Attorney, Agent, or Firm* — Cantor Colburn LLP; Teddi Maranzano

(57) ABSTRACT

Embodiments of the invention include method, systems and computer program products for using a target similarity calculation to identify relevant content in a corpus of documents or records. The computer-implemented method includes creating, by a processor, a term frequency (TF) list for one or more documents of a corpus. The processor calculates an inverse document frequency (IDF) for each listed term. The processor calculates a TF-IDF for each listed term. The processor determines a similarity ranking for one or more documents of the corpus using a target similarity calculation using the TF-IDF for each listed term.

13 Claims, 6 Drawing Sheets

(56) References Cited

U.S. PATENT DOCUMENTS

| | | | | |
|---|---|---|---|---|
| 2002/0165873 | A1* | 11/2002 | Kwok | G06K 9/00872 |
| | | | | 715/268 |
| 2004/0049499 | A1* | 3/2004 | Nomoto | G06F 16/3329 |
| 2010/0217731 | A1* | 8/2010 | Fu | G06F 16/35 |
| | | | | 706/20 |
| 2011/0219012 | A1* | 9/2011 | Yih | G06F 16/00 |
| | | | | 707/749 |
| 2012/0209830 | A1* | 8/2012 | Assodallahi | G06F 16/3323 |
| | | | | 707/722 |
| 2012/0330978 | A1 | 12/2012 | Yih et al. | |
| 2013/0013604 | A1* | 1/2013 | Kobayasi | G06F 17/2211 |
| | | | | 707/737 |
| 2013/0346424 | A1 | 12/2013 | Zhang et al. | |
| 2014/0067368 | A1 | 3/2014 | Yih et al. | |
| 2015/0154497 | A1 | 6/2015 | Braziunas et al. | |
| 2016/0140231 | A1 | 5/2016 | Agarwal | |
| 2018/0012284 | A1* | 1/2018 | Igarashi | G06Q 30/0631 |
| 2019/0065550 | A1* | 2/2019 | Stankiewicz | G06F 16/2237 |

OTHER PUBLICATIONS

X. Wang, et al.,"Identifying Relevant Event Content for Real-Time Event Detection", ResearchGate, IEEE ACM International Conference on Advances in social Networks Analysis and Mining, Aug. 17-20, 2014, p. 1-5.

Y. Gu, et al.,"Learning Global Term Weights for Content-based Recommender Systems", ACM, Apr. 11-15, 2016, p. 1-10.

Dot Product "Linear Algebra, Dot Product", retrieved from http://www.mathreference.com/la,dot.html; downloaded Sep. 23, 2019; 2 pgs.

Encyclopedia of Mathematics "Inner product", retrieved from https://www.encyclopediaofmath.org/index.php.?title=Inner_product&oldid=29549; last modified Mar. 22, 2013; 2 pgs.

Salton, G. et al. "A Vector Space Model for Automatic Indexing", Communications of the ACM; Nov. 1975; vol. 18, No. 11, pp. 614-620.

Torrence, Bruce "WOLFRAM Demonstrations Project—Dot Product" retrieved from http://demonstrations.wolfram.com/DotProduct/; dated Mar. 2011; 2 pgs.

Weisstein, Eric W. "Dot Product" from MathWorld—A Wolframe Web Resource, located at http://mathworld.wolfram.com/DotProduct.html; last updated Tue. Sep. 17, 2019; 2 pgs.

Wikipedia "Dot product", retrieved from https://en.wikipedia.org/wiki/Dot_product; downloaded Sep. 23, 2019; 9 pgs.

Wikipedia "Vector space model", retrieved from https://en.wikipedia.org/wiki/Vector_space_model; downloaded Sep. 23, 2019; 4 pgs.

* cited by examiner

| Term | Target Record | Record 1 | Record 2 | Record 3 | Record 4 | Record 5 | Docs with term | Record 30,000 |
|---|---|---|---|---|---|---|---|---|
| CPU | 752 | 2491 | | 41 | 2 | | | 5 |
| DIMM | 233 | | 498 | 10 | 1 | | | 500 |
| SAN | 202 | 213 | | 2 | 1121 | | | 5000 |
| HBA | 127 | 3471 | | 459 | 612 | | | 30000 |
| AIX | 121 | 5 | 56 | | 205 | | | 1 |
| planar | 89 | | | 203 | | 210 | | 20 |
| electrolytic | 72 | | 12 | | | 45 | | 200 |
| insulator | 71 | 1 | 118 | 12 | | 3 | | 200 |
| short | 34 | | | | 1 | | | 2000 |
| recovery | 21 | 29 | 222 | | 782 | | | 20000 |
| resistor | 12 | 555 | 18 | | | 5 | | 5 |
| Docs with Term | 11/11 | 6/11 | 6/11 | 6/11 | 6/11 | 3/11 | | |
| Match count | | 7/11 | | | | | | 0.0000 |

410

| Term | Target Record | Record 1 | Record 2 | Record 3 | Record 4 | Record 5 | Docs with term |
|---|---|---|---|---|---|---|---|
| CPU | 0.4337 | 0.3682 | | 0.0564 | 0.0007 | | 5 |
| DIMM | 0.1344 | | 0.5390 | 0.0138 | 0.0004 | | 500 |
| SAN | 0.1165 | 0.0315 | | 0.0028 | 0.4115 | | 5000 |
| HBA | 0.0732 | 0.5131 | | 0.6314 | 0.2247 | | 30000 |
| AIX | 0.0698 | 0.0007 | 0.0606 | | 0.0753 | | 1 |
| planar | 0.0513 | | | 0.2792 | | 0.7985 | 20 |
| electrolytic | 0.0415 | | 0.0130 | | | 0.1711 | 200 |
| insulator | 0.0409 | 0.0001 | 0.1277 | 0.0165 | 0.0004 | 0.0114 | 200 |
| short | 0.0196 | | | | | | 2000 |
| recovery | 0.0121 | 0.0043 | 0.2403 | | 0.2871 | | 20000 |
| resistor | 0.0069 | 0.0820 | 0.0195 | | | 0.0190 | 5 |
| Total words | 1734 | 6765 | 924 | 727 | 2724 | 263 | |

| Term | Target Record | Record 1 | Record 2 | Record 3 | Record 4 | Record 5 | Docs with term | Record 30,000 |
|---|---|---|---|---|---|---|---|---|
| CPU | 3.7782 | 3.7782 | | 3.7782 | 3.7782 | | | 5 |
| DIMM | 1.7782 | | 1.7782 | 1.7782 | 1.7782 | | | 500 |
| SAN | 0.7782 | 0.7782 | | 0.7782 | 0.7782 | | | 5000 |
| HBA | | | | | | | | 30000 |
| AIX | 4.4771 | 4.4771 | 4.4771 | | 4.4771 | | | 1 |
| planar | 3.1761 | | | 3.1761 | | 3.1761 | | 20 |
| electrolytic | 2.1761 | | 2.1761 | | | 2.1761 | | 200 |
| insulator | 1.1761 | 1.1761 | 1.1761 | 1.1761 | 1.1761 | 1.1761 | | 2000 |
| short | 0.1761 | 0.1761 | | | | | | 20000 |
| recovery | 3.7782 | 3.7782 | 3.7782 | | 3.7782 | | | 5 |
| resistor | 3.7782 | 3.7782 | 3.7782 | | | 3.7782 | | 5 |
| IDF-Sum | 25.0722 | 17.9419 | 17.1638 | 10.6866 | 15.7658 | 10.3064 | | 0.0000 |

510

| Term | Target Record | Record 1 | Record 2 | Record 3 | Record 4 | Record 5 | Docs with term |
|---|---|---|---|---|---|---|---|
| CPU | 1.6385 | 1.3912 | | 0.2131 | 0.0028 | | 5 |
| DIMM | 0.2389 | | 0.9584 | 0.0245 | 0.0007 | | 500 |
| SAN | 0.0906 | 0.0245 | | 0.0021 | 0.3202 | | 5000 |
| HBA | | | | | | | 30000 |
| AIX | 0.3124 | 0.0033 | 0.2713 | | 0.3369 | | 1 |
| planar | 0.1630 | | | 0.8869 | | 2.5360 | 20 |
| electrolytic | 0.0904 | | 0.0283 | | | 0.3723 | 200 |
| insulator | 0.0482 | 0.0002 | 0.1502 | 0.0194 | 0.0004 | 0.0134 | 2000 |
| short | 0.0035 | | | | | | 20000 |
| recovery | 0.0458 | 0.0162 | 0.9077 | | 1.0846 | | 5 |
| resistor | 0.0261 | 0.3100 | 0.0736 | | | 0.0718 | 5 |
| TF-IDF Sum | 2.6574 | 1.7453 | 2.3895 | 1.1459 | 1.7456 | 2.9936 | |

US 10,733,220 B2

DOCUMENT RELEVANCE DETERMINATION FOR A CORPUS

BACKGROUND

The present invention relates in general to text ranking techniques, and more specifically, to using a text similarity calculation to determine the relevance of documents in a corpus.

In general, record or document searching utilizes a query to return search results deemed most appropriate based on the associated search query. The search results are predicated on search terms entered in the search query and an algorithm used to perform the query.

SUMMARY

Embodiments of the invention are directed to a method for using a target similarity calculation to identify relevant content in a corpus of documents or records. A non-limiting example of the computer-implemented method includes creating, by a processor, a term frequency (TF) list for one or more documents of a corpus. The processor calculates an inverse document frequency (IDF) for each listed term. The processor calculates a TF-IDF for each listed term. The processor determines a similarity ranking for one or more documents of the corpus using a target similarity calculation using the TF-IDF for each listed term.

Embodiments of the invention are directed to a computer program product that can include a storage medium readable by a processing circuit that can store instructions for execution by the processing circuit for performing a method for using a target similarity calculation to identify relevant content in a corpus of documents or records. The method includes creating a term frequency (TF) list for one or more documents of a corpus. The processor calculates an inverse document frequency (IDF) for each listed term. The processor calculates a TF-IDF for each listed term. The processor determines a similarity ranking for one or more documents of the corpus using a target similarity calculation using the TF-IDF for each listed term.

Embodiments of the invention are directed to a system. The system can include a processor in communication with one or more types of memory. The processor can be configured to create a term frequency (TF) list for one or more documents of a corpus. The processor can be further configured to calculate an inverse document frequency (IDF) for each listed term. The processor can be further configured to calculate a TF-IDF for each listed term. The processor can be further configured to determine a similarity ranking for one or more documents of the corpus using a target similarity calculation using the TF-IDF for each listed term.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter that is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 4 is a diagram illustrating an exemplary term frequency and normalized term frequency calculations for a target document and corpus of documents according to one or more embodiments of the present invention;

FIG. 5 is a diagram illustrating an exemplary inverse document frequency and TF-IDF calculations for a target document and corpus of documents according to one or more embodiments of the present invention.

Figure 1:
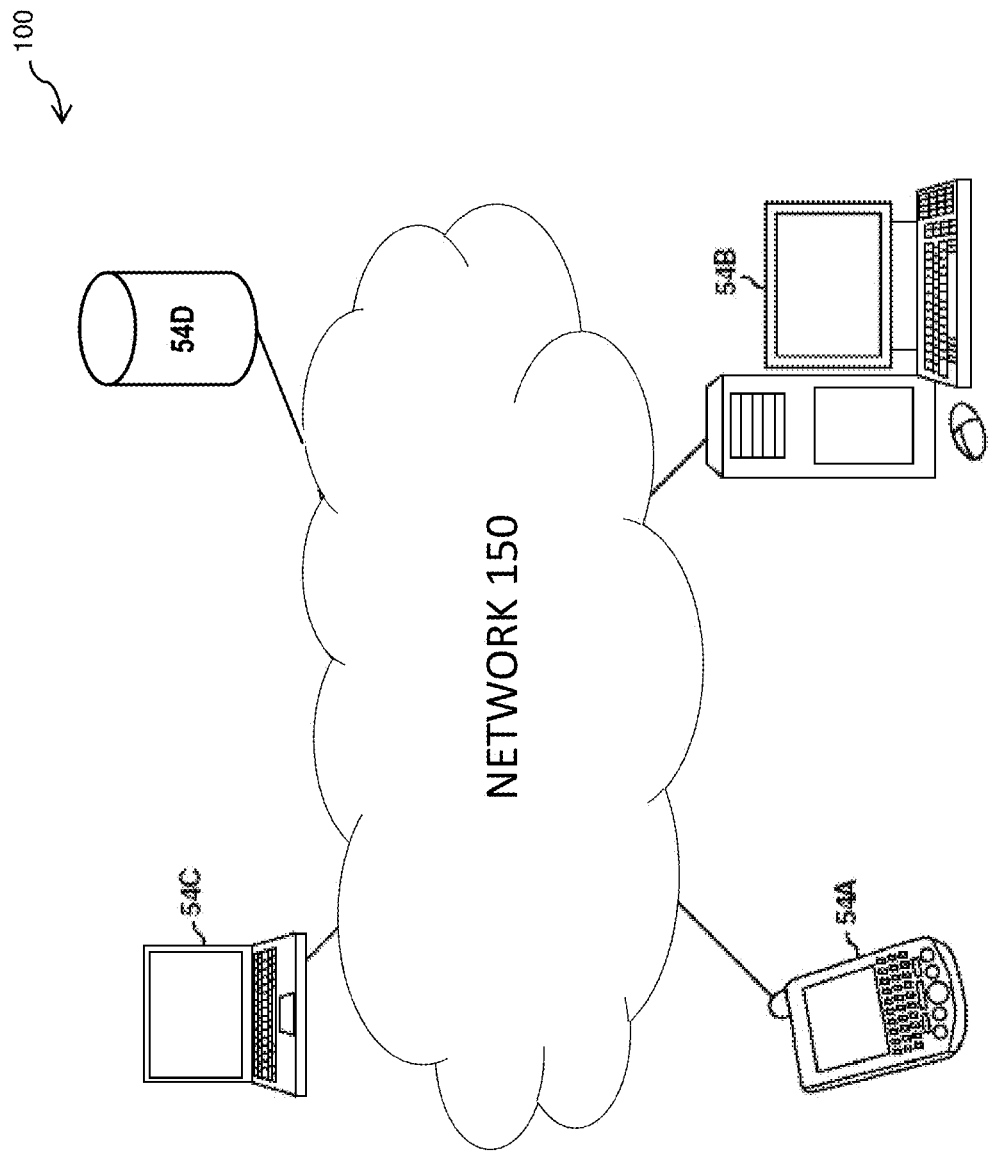
FIG. 1 is a diagram illustrating an exemplary operating environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, which are related to identifying relevant content in a corpus of documents or records. Search engines utilize search terms to locate records or documents of relevance to the query. However, the methods used by modern search engines to find webpages most relevant to a query are more complicated than simply a text-based ranking since there may be millions of webpages that contain a particular word or phrase. The relevance of a webpage is judged by examining the number of links connected to the webpage. A rank of each webpage is assigned based on the number of pages pointing to the webpage. While a ranking scheme using the number of links has proven effective for finding pertinent webpages, such a scheme does not lend itself for use in determining the relevance of records or documents in a large corpus of records or documents especially when there is a small number of users and thus little or no link history to examine.

One approach used to identify records or documents is scoring each record or document by calculating a TF-IDF (Term Frequency-Inverse Document Frequency). A cosine similarity can then be used to score or weight the relevance of the documents.

Weighting documents (i.e., term weighting) can be based on an assumption that the weight of a term that occurs in a document is simply proportional to a term frequency (TF). Term Frequency is related to the number of occurrences of each term in the record or document. Often, a normalized term frequency ($TF_N$) can be used in order to prevent giving a higher weighting to a larger document. The $TF_N$ can be calculated by dividing the number of times a term appears in the document by the sum of all term frequencies. This calculation produces a decimal fraction between 0 and 1. If the term does not appear at all in the document, $TF_N$=0. If the term is the only term in the document, $TF_N$=1. Accordingly, the more prevalent a term is in the record or document, the closer the $TF_N$ will be to 1.

Inverse Document Frequency (IDF) weighting can be calculated by taking the log of the total number of documents in a corpus divided by the number of documents in which the term appears. The IDF can be used to give more weight to rarer terms. The IDF for any term is the same across the entire corpus. When a term appears in all the records or documents, the IDF=0. The rarer the term across the corpus, the closer the value will be to the order of magnitude of the number of documents in the corpus. For example, if we have 1,000 records or documents and only 1 contains the term, the IDF=3 and if we had 100,000 documents and only one contains the term, the IDF=5.

The TF-IDF is the product of TF and IDF. The TF-IDF can be calculated for each search term. The result of the TF-IDF can produce an N-dimensional vector of TF-IDF weights in each record or document where N is equal to the number of terms used for the search. A vector is a list of terms in a row or a column that in some cases may be a subsection of a larger matrix of terms.

Also, a dot-product or cosine similarity can be calculated between an N-dimensional search query TF-IDF vector and the TF-IDF vector for each document. The TF-IDF for each search term in the search query vector is multiplied by the TF-IDF for the same, corresponding term in each document. The results are summed together and the total is divided by the product of the resultant each of the N-dimensional vectors which normalizes the result by ensuring that the value of the result ranges from 0 to 1. The corresponding value represents an overall score for each document. Each resultant is calculated by the square root of the sum of the squared of each element (or dimension) of the vector.

Accordingly, the document with the highest score can be considered the document having the greatest relevance to the query. For example, if the document does not contain any of the target search terms, the TF-IDF=0. Documents that have a large number of rare search terms relative to the rest of the corpus of records or documents will have a higher TF-IDF value for that search term.

In addition, a K-mean analysis can be used to find coherent groups or clusters of data and can be run on TF-IDF weightings. K-mean analysis can be used to find a cluster centroid or center of mass by randomly assigning data points and then moving the centroids to better fit the clusters themselves. A common method in K-mean analysis is to initially place the centroid in the same place as some data points and then assign the remaining data points to the nearest cluster centroid. The centroid would then be updated to be the mean value of the cluster. The assignment and centroid update step is repeated until a local optimum is reached. One of the drawbacks of the K-mean analysis and clustering is that center of mass calculations can occur even when the data does not cluster well.

Current implementations for identifying relevant documents in a corpus are inefficient and compute intensive. Accordingly, implementing document ranking techniques that more effectively find relevant documents and reduce computational requirements is needed. Hence, a solution that allows for a more effective and automated approach to identifying relevant documents would be useful in extending the analytical and cognitive capabilities of computer systems.

Turning now to an overview of aspects of the invention, one or more embodiments of the invention address the above-described shortcomings of the prior art by searching, dissecting, and extracting relevant terms automatically from a target document which are then used in conjunction with an enhanced TF-IDF and target similarity method to determine relevance of other documents in a corpus in relation to the target document and return one or more relevant documents for display to a user. Moreover, the target document can include a plurality of terms can also comprise text.

The one or more embodiments of the invention include a target similarity and a difference gradient (TSDG) to identify relevant content in a corpus of documents or records relative to a target document. The target similarity portion calculates a target similarity score for a target document by comparing the target document against itself thereby creating a maximum target similarity value, which is then used as the denominator in calculating the target similarity scores for the rest of the documents in the corpus. The target similarity score utilizes a target similarity weighting instead of a cosine similarity weighting. The TSDG is used to identify the greatest difference in terms between the documents in the corpus identified as most similar to the target document, which can be viewed and/or transmitted to a computing device. The TDSG can also be used in conjunction with a web browser/search engine to improve functionality.

The above-described aspects of the invention address the shortcomings of the prior art by utilizing a target similarity weighting instead of a cosine similarity weighting. The target similarity weighting is a simpler computation than the traditional cosine similarity weighting because a calculation of the square root of the sum of the square for every N-dimensional document vector in the corpus is no longer needed. Additionally, a difference gradient portion is also utilized to locate and isolate similarities in documents as well as further identify and locate distinctions between the identified similar documents. Accordingly, the relevance of records and documents in a corpus in light of a target document or record can be determined in a simplified manner that reduces computational requirements.

FIG. 1 is a block diagram illustrating an operating environment 100 according to one or more embodiments of the present invention. The environment 100 can include one or more computing devices, for example, personal digital assistant (PDA) or cellular telephone (mobile device) 54A, server 54B, computer 54C, and/or storage device 54D which are connected via network 150. The one or more computing devices may communicate with one another using network 150. Storage device 54D can include network attached and/or remote storage.

Network 150 can be, for example, a local area network (LAN), a wide area network (WAN), such as the Internet, a dedicated short-range communications network, or any combination thereof, and may include wired, wireless, fiber optic, or any other connection. Network 150 can be any combination of connections and protocols that will support communication between mobile device 54A, server 54B, computer 54C, and/or storage device 54D respectively.

Figure 2:
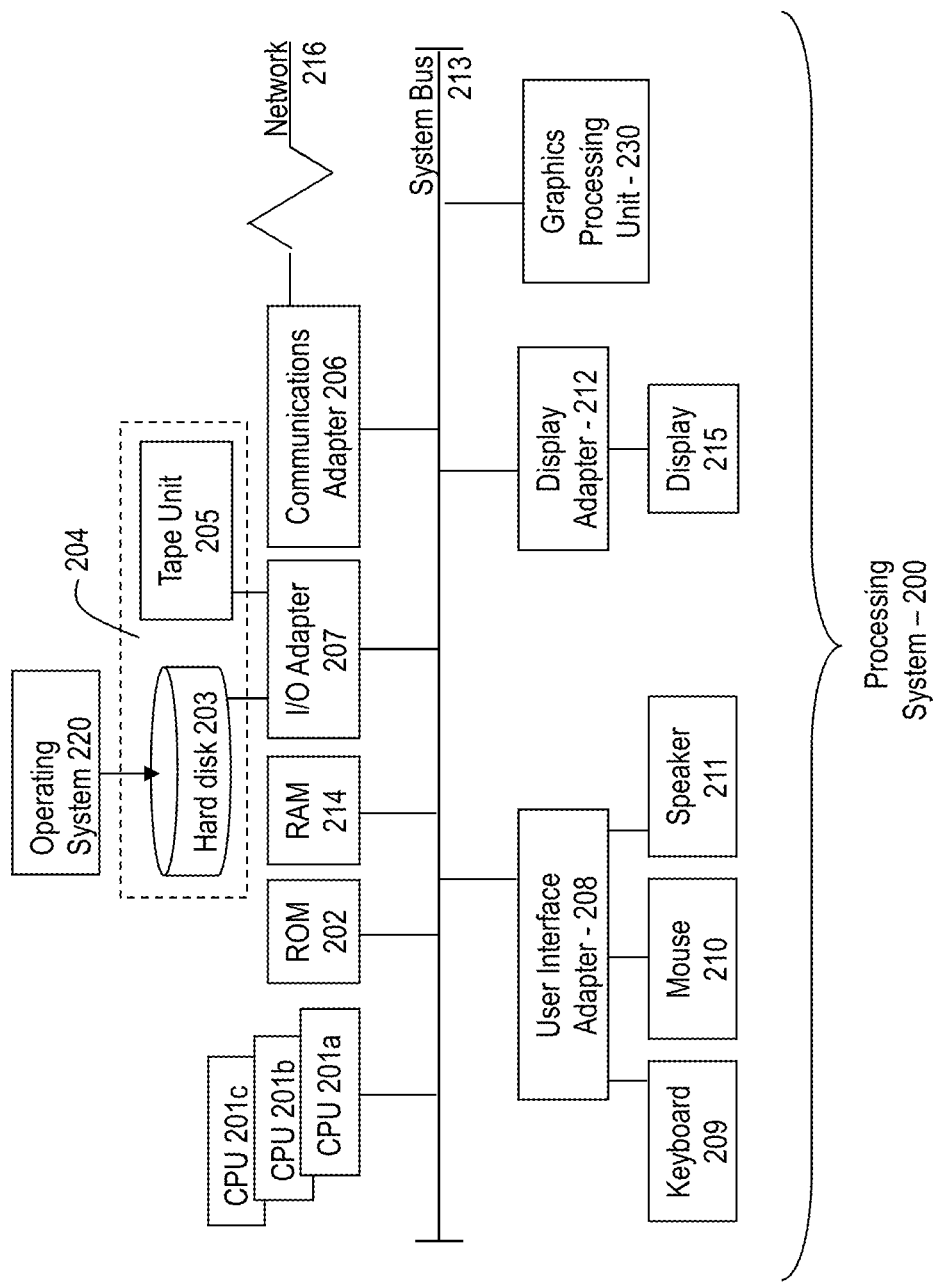
FIG. 2 is a block diagram illustrating one example of a portion of the processing system one or more computing devices described in FIG. 1 for practice of the teachings herein.

Referring to FIG. 2, there is shown an embodiment of a processing system 200 for implementing the teachings herein. The processing system 200 can form at least a portion of one or more computing devices, mobile device 54A, server 54B, computer 54C and storage device 54D. In this embodiment, the processing system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory 214 and various other components via a system bus 213. Read only memory (ROM) 202 is coupled to the system bus 213 and may include a basic input/output system (BIOS), which controls certain basic functions of the processing system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or tape storage drive 205 or any other similar component. I/O adapter 207, hard disk 203, and tape storage device 205 are collectively referred to herein as mass storage 204. Operating system 220 for execution on the processing system 200 may be stored in mass storage 204. A network adapter 206 interconnects bus 213 with an outside network 216 enabling data processing system 200 to communicate with other such systems. A screen (e.g., a display monitor) 215 can be connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A keyboard 209, mouse 210, and speaker 211 can all be interconnected to bus 213 via user interface adapter 208, which may include, for example, a Super I/O chip integrating multiple device adapters into a single integrated circuit.

In exemplary embodiments, the processing system 200 includes a graphics-processing unit 230. Graphics processing unit 230 is a specialized electronic circuit designed to manipulate and alter memory to accelerate the creation of images in a frame buffer intended for output to a display. In general, graphics-processing unit 230 is very efficient at manipulating computer graphics and image processing, and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including system memory 214 and mass storage 204, input means such as keyboard 209 and mouse 210, and output capability including speaker 211 and display 215. In one embodiment, a portion of system memory 214 and mass storage 204 collectively store an operating system to coordinate the functions of the various components shown in FIG. 2.

Figure 3:
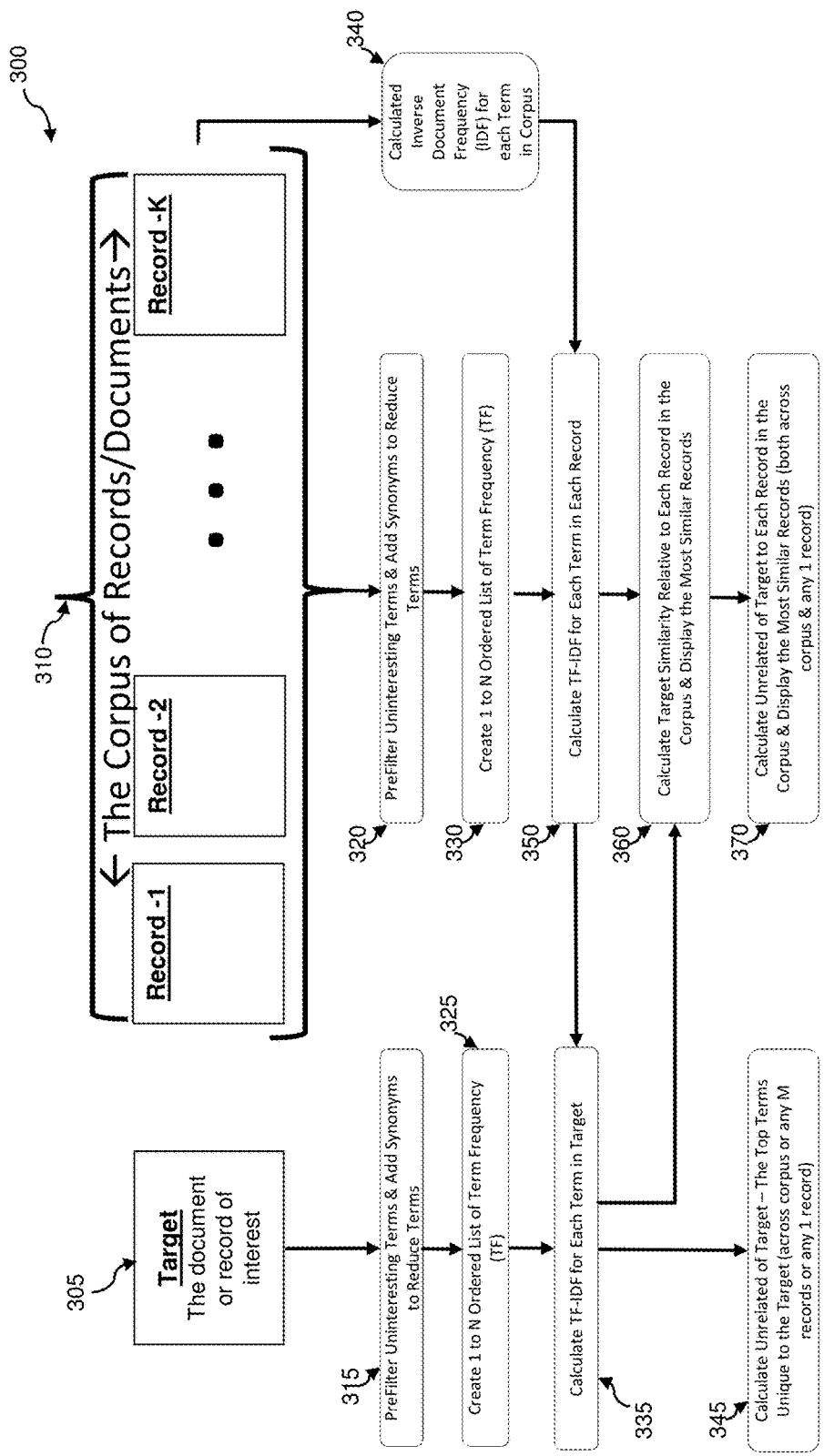
FIG. 3 is a flow diagram illustrating a method for using a Target Similarity and a Difference Gradient (TSDG) to identify relevant content in a corpus of documents or records relative to a target document according to one or more embodiments of the present invention.

FIG. 3 illustrates an exemplary method for using a target similarity and a difference gradient (TSDG) to identify relevant content in a corpus of documents or records relative to a target document according to one or more embodiments of the present invention. At block 305 of method 300, a target document, i.e. a document serving as a reference document for a search, is identified. At block 310, a corpus of documents, i.e. one or more documents to be searched, is identified. The corpus can include all stored documents or one or more portions of the stored documents. The corpus or portions thereof can reside in one or more storage devices, for example, mass storage 204 and/or storage device 54D.

At block 315, the target document is filtered to identify and eliminate common and/or uninteresting words that are not nouns or verbs (e.g., the, and, but, to, etc. . . . ). At block 315, method 300 also combines terms within the target document that are considered synonyms and also use stemming, lemmatization or similar techniques to condense words to a common root word. Stemming usually refers to a crude heuristic process that truncates the ends of words in the hope of achieving this goal correctly most of the time, and often includes the removal of derivational affixes. Lemmatization usually refers to a more sophisticated process whereby vocabulary and morphological analysis of words is performed aimed at removing inflectional endings only and to return the base or dictionary form of a word, which is known as the lemma. At block 320, each document of the corpus is filtered to identify and eliminate common and/or uninteresting words that are not nouns or verbs and combine terms within each document of the corpus that are considered synonyms.

At block 325, a normalized $TF_N$ is calculated for the target document. As previously mentioned, the normalized $TF_N$ is calculated by dividing the number of times each term appears in the target document by the sum of all term frequencies. At block 330, a normalized $TF_N$ is calculated for each document in the corpus for each term that is in the target document.

At block 340, an IDF is calculated for each term in the corpus. The IDF is the log of the total number of documents in the corpus divided by the number of documents in which a term appears. The IDF is used to give more weight to rare terms in the corpus, and its value is not unique to each document but the same value for any common term across all the documents in the corpus.

At block 350, the IDF calculated at block 340 is multiplied by the TF, determined at block 330, for each term in the corpus to produce a TF-IDF weighting for the corpus. Accordingly, the IDF is calculated across the corpus and is thus the same value for any particular term across the corpus; however, once the IDF is multiplied by the TF which will be different for the same term in each document, the resulting TF-IDF is unique for each term in each document. At block 335, the IDF calculated at block 340 is multiplied by the TF, determined at block 325, for each term in the target document to produce a TF-IDF weighting for the target. The TF-IDF for each term in the target document is calculated by multiplying the TF-IDF for the same term (for the same dimension) by a corresponding term in each document in the corpus. The output of the calculation can be summed together, where the sum can represent an overall TF-IDF score for each corpus document. The resulting TF-IDF weightings for the target document and corpus create a set of N-dimensional TF-IDF vectors, where N is the number of terms in the target that characterize the relevant content of the target. At block 345, method 300 determines terms within the target document that are unique to the target document. The uniqueness of terms of the target can be in relation to the entire corpus, a subset of the corpus, or a single document within the corpus. The uniqueness of terms can be used to indicate one or more documents having the greatest difference between the documents of the corpus deemed most similar.

At block 360, a target similarity (TS) calculation is performed on the target document and each document of the corpus to output documents of the corpus determined to be relevant according to a predetermined criterion, which can be displayed and/or transmitted to a computing device (ex., personal digital assistant (PDA) or cellular telephone (mobile device) 54A, server 54B, computer 54C and/or storage device 54D). The TS calculation begins by calculating a dot product of 2 N-dimensional vectors A (the corpus document) and B (the target document) as follows:

$$A \cdot B = \|A\| \, \|B\| \cos \theta = \sum_{i=1}^{N} a_i b_i = a_1 b_1 + a_2 + b_2 + \ldots + a_N b_N.$$

$$A \text{ Cosine Similarity} = \frac{A \cdot B}{\|A\| \, \|B\|} = \frac{\sum_{i=1}^{N} a_i b_i}{\left(\sqrt{\sum_{i=1}^{N} a_i^{\,2}}\right)\left(\sqrt{\sum_{i=1}^{N} b_i^{\,2}}\right)}$$

The denominator of the Cosine Similarity equation is the square root of the sum of the squares for all the dimensions of the corpus document vector A multiplied by the square root of the sum of the squares for all the dimensions of the target document vector B.

The resultant dot product produces a projection of the corpus document A onto the target document B which indicates a level of relevance for the corpus document to the target document. For example, if vectors A and B are orthogonal (i.e., the angle between them is 90 degrees indicating no like terms within A and B), then the dot product is zero. If document B is projected on itself, the projection of B on B would have an angle equal to zero, and thus the cosine of the projection is 1 and the dot product is the resultant of B squared ($\|B^2\|$).

The cosine values for the TS calculation are therefore restricted and thus differ from normal cosine values in that the vector dimensions are always non-negative real numbers. Accordingly, under a TS calculation, the angle between the target vector B and the document vector A will only vary from 0 to 90 degrees ($\pi/2$), so the cosine will only vary from 0 to 1, instead of 1 to −1 in an unrestricted cosine calculation.

While it is mathematically possible for $\|A\|>\|B\|$, in almost all cases, $\|A\|\leq\|B\|$, and will only be equal when A=B. Thus, unless the target document B is almost identical to the corpus document A, document A will not contain all the terms present in the document B. In order for $\|A\|>\|B\|$, the corpus document A would require at least 1 very rare term across the corpus that is present in both document A and document B. This would be highly unusual and only the case for an arcane pair. The most common arcane pair is when a corpus document is a later version of the target document, for example, a follow on patent application in which a preceding patent is used as a starting point for writing the follow on patent application.

Accordingly, the TS calculation can be used to find identical records by calculating the dot product of corpus document A and target document B in which the result of the dot product is normalized by dividing the result by the square root of the sum of the squares of target document B multiplied by itself instead of the square root of the sum of the squares of A times the square root of the sum of the squares of B which would occur in a cosine similarity calculation. Accordingly, the magnitude of the target document most often will be larger than the magnitude of the corpus document since the most relevant terms are derived from the target document. Thus, a continuation of block 360 is that the TS calculation divides the dot product by the resultant of the target document as follows:

$$\text{Target Similarity} = \frac{A \cdot B}{\|B\| \, \|B\|} = \frac{\sum_{i=1}^{N} a_i b_i}{\left(\sqrt{\sum_{i=1}^{N} b_i^2}\right)\left(\sqrt{\sum_{i=1}^{N} b_i^2}\right)}$$

The denominator of the Target Similarity equation is the square root of the sum of the squares for all the dimensions of the target vector multiplied by itself, which is simply the original sum of the squares. This eliminates the need to calculate the square root of each of the corpus document vectors.

Because the resultant TS should vary between 0 and 1, unless an arcane pair is encountered, the associated TS calculation is simpler in that the square root of the sum of the squares for every N-dimensional document vector in the corpus is no longer required to be calculated. Instead, the TS simply uses the sum of the squares resultant for the target, which can then be used repeatedly for each similarity comparison calculation.

Accordingly, the TS variance between 0 and 1 for a particular document in the corpus as compared to the target document can be converted to a percentage and associated with the corpus document. The documents within the corpus can be ranked according to a corpus document's associated percentage, which is illustrated below in FIG. 6.

Because the corpus documents each have a percentage indicating the corpus document's similarity relative to the target document and can be ranked accordingly, at least a portion of the corpus documents (similar documents) can be output and displayed based on each corpus document's ranking. The corpus documents displayed can be displayed in an order from most similar to least similar relative to the target document.

At block 370, in order to elucidate significant differences between at least a determined portion of the most similar documents of the corpus, method 300 performs a difference gradient (DG) analysis on the determined portion of the most similar documents of the corpus. The DG reviews the associated determined portion of the most similar documents of the corpus and identifies the terms of most significance based on the TF-IDF for each term that is not found in the target document. Accordingly, method 300 can also display corpus documents of the determined portion of the most similar documents of the corpus based on the DG analysis. The displayed portion of the corpus at block 370 are documents the most different within the determined portion of the most similar documents of the corpus.

Accordingly, method 300 can be valuable in evaluating certain types of documents (ex., patents, marketing materials, product specifications, technical specifications, scholarly publications, term papers or the like), where not only is it important to identify similarities, but also the differences between similar documents.

FIG. 4 is a diagram illustrating an exemplary term frequency (TF) 405 and normalized term frequency (TF$_N$) 410 calculations for a target document and corpus of documents according to one or more embodiments of the present invention. FIG. 5 is a diagram illustrating an exemplary inverse document frequency (IDF) 505 and TF-IDF 510 calculations for a target document and corpus of documents according to one or more embodiments of the present invention.

Figure 6:
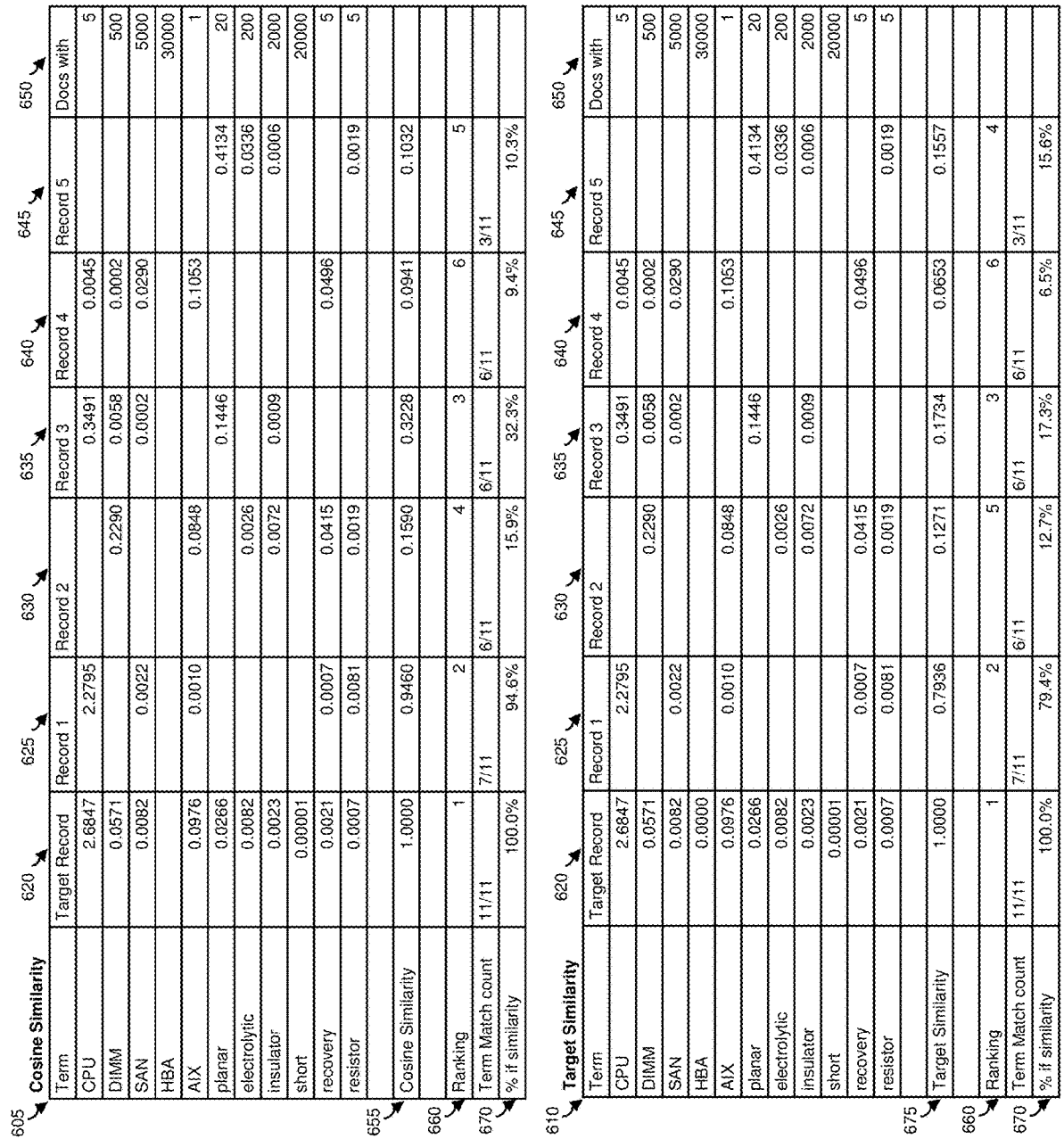
FIG. 6 is a diagram illustrating document relevance determination implementations and differences based on the use of a cosine similarity calculation versus a target similarity calculation according to one or more embodiments of the present invention.

FIG. 6 is a diagram illustrating document relevance determination implementations and differences based on the use of a cosine similarity calculation versus a target similarity calculation according to one or more embodiments of the present invention. The cosine similarity calculation and target similarity calculation are based on the calculations illustrated in FIGS. 4 and 5. Block 605 illustrates a plurality of records of a corpus analyzed for similarity according to a cosine similarity calculation. Block 610 illustrates the same plurality of records analyzed for similarity according to a target similarity calculation. The corpus for block 605 and 610 can comprise many documents (ex., 30,000 documents).

Column 620 lists a square of TF-IDF score for the top 11 terms with the highest normalized term frequency (TF$_N$) score. In column 620, the corpus document is the target itself. The overall cosine similarity score for each document is displayed in row 655 and the overall target similarity score for each document is displayed in row 675. Columns 625, 630, 635, 640 and 645 of block 605 and 610 illustrate documents returned based on the similarity analysis associated with blocks 605 and 610. Each of the columns 625, 630, 635, 640 and 645 list a plurality of terms in the associated document and an associated TF$_N$ for each listed term. Column 650 indicates the number of documents within the corpus that contain the listed term.

Row 660 illustrates a rank assigned to each document (620, 625, 630, 635, 640 and 645) based on the associated similarity analysis for block 605 and 610. Row 670 illustrates a match percentage assigned to each document (620, 625, 630, 635, 640 and 645) based on the associated similarity analysis for block 605 and 610. Because the cosine similarity calculation and a target similarity calculation are calculated differently, the rankings 660 and match percentage 670 provided in block 605 and 610 differ. For example, document 625 is less similar to the target document when compared using the target similarity calculation than the cosine similarity calculation.

Because the target similarity calculations associated with block 610 use the square root of the sum of the squares resultant for the target document instead of the square root of the sum of the square for every N-dimensional document vector in the corpus required by the cosine similarity analysis of block 605, the ranked documents can be determined and displayed in a faster manner. Accordingly, computations under the target similarity calculations are less processor intensive than cosine similarity calculations.

Also, one or more embodiments of the present invention can create metadata that describes the corpus of records or documents that can be reused to speed up and simplify the analysis of the corpus. In addition, a simple table approach that lists each term and the documents which contain the term can be used instead of a linked list. The terms can be listed alphabetically and each assigned a unique document identifier and the TF-IDF value for the corresponding term. A linked list, i.e., an ordered set of data elements each containing a link to its successor, can be employed to store both the unique document identifier and the TF-IDF value for the corresponding term in that document or record. The order of the links can vary. For example, the order can be alphabetical, chronological or the like. Using the linked list as described can enable an analysis of a specific document of interest (e.g. a document that contains the term of interest) without needing to scan the full linked list (entire corpus).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for using a target similarity calculation to identify relevant content in a corpus of documents or records, the method comprising:
    creating, by a processor, a term frequency (TF) list for one or more documents of a corpus;
    calculating, by the processor, an inverse document frequency (IDF) for each listed term;
    calculating, by the processor, a TF-IDF for each listed term;
    identifying, by the processor, two documents of the corpus having a highest similarity ranking to a target document using a target similarity calculation using the TF-IDF for each listed term, wherein the target similarity calculation is based at least in part on a maximum target similarity value which is a similarity value determined by comparing the target document to itself;
determining a difference gradient for each of the two documents of the corpus; and
displaying one or more terms of the target document not found in the two documents of the corpus based on the difference gradient.

2. The computer-implemented method of claim 1, further comprising displaying at least one of the one or more documents of the corpus based on the similarity ranking.

3. The computer-implemented method of claim 1, further comprising transmitting at least one of the one or more documents of the corpus to a computing device based on the similarity ranking.

4. The computer-implemented method of claim 1, wherein the target similarity calculation is based at least in part on terms obtained from the target document.

5. The computer-implemented method of claim 1, wherein a resulting value of the target similarity calculation varies between 0 and 1.

6. The computer-implemented method of claim 1, wherein the TF for each term is normalized.

7. A computer program product for using a target similarity calculation to identify relevant content in a corpus of documents or records, the computer program product comprising:
a non-statutory computer readable storage medium having stored thereon first program instructions executable by a processor to cause the processor to:
create a term frequency (TF) list for one or more documents of a corpus;
calculate an inverse document frequency (IDF) for each listed term;
calculate a TF-IDF for each listed term; and
identify two documents of the corpus having a highest similarity ranking to a target document using a target similarity calculation using the TF-IDF for each listed term, wherein the target similarity calculation is based at least in part on a maximum target similarity value which is a similarity value determined by comparing the target document to itself;
determine a difference gradient for each of the two documents of the corpus; and
display one or more terms of the target document not found in the two documents of the corpus based on the difference gradient.

8. The computer program product of claim 7, further comprising displaying at least one of the one or more documents of the corpus based on the similarity ranking.

9. The computer program product of claim 7, further comprising transmitting at least one of the one or more documents of the corpus to a computing device based on the similarity ranking.

10. The computer program product of claim 7, wherein the target similarity calculation is based at least in part on terms obtained from the target document.

11. The computer program product of claim 7, wherein a resulting value of the target similarity calculation varies between 0 and 1.

12. A system comprising:
a storage medium coupled to a processor;
the processor configured to:
create a term frequency (TF) list for one or more documents of a corpus;
calculate an inverse document frequency (IDF) for each listed term;
calculate a TF-IDF for each listed term;
identify two documents of the corpus having a highest similarity ranking for one or more documents of the corpus to a target document using a target similarity calculation using the TF-IDF for each listed term, wherein the target similarity calculation is based at least in part on a maximum target similarity value which is a similarity value determined by comparing the target document to itself;
determine a difference gradient for each of the two documents of the corpus; and
display one or more terms of the target document not found in the two documents of the corpus based on the difference gradient.

13. The system of claim 12, wherein the target similarity calculation is based at least in part on terms obtained from the target document.

* * * * *